(12) United States Patent
Baranowski et al.

(10) Patent No.: US 7,876,009 B2
(45) Date of Patent: Jan. 25, 2011

(54) PRESSED IN STYLE MOTOR ATTACHMENT

(75) Inventors: Richard S Baranowski, Lakeview, NY (US); Kari Ann Sausen, Clarence, NY (US); Edward Douglas Pettitt, Burt, NY (US); Steve M Zielinski, N. Tonawanda, NY (US)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 12/229,625

(22) Filed: Aug. 26, 2008

(65) Prior Publication Data

US 2009/0058209 A1  Mar. 5, 2009

Related U.S. Application Data

(60) Provisional application No. 60/966,459, filed on Aug. 28, 2007.

(51) Int. Cl.
*H02K 5/00* (2006.01)
*F01P 7/10* (2006.01)
*F16M 1/00* (2006.01)
*F04B 17/00* (2006.01)

(52) U.S. Cl. .................. 310/89; 310/91; 123/41.49; 267/136; 417/360

(58) Field of Classification Search .................. 310/89, 310/91; 123/41.49; 417/360; 267/136
See application file for complete search history.

(56) References Cited

U.S. PATENT DOCUMENTS

| 5,133,617 | A | 7/1992 | Sokn et al. | |
|---|---|---|---|---|
| 5,533,704 | A | 7/1996 | Fischinger et al. | |
| 6,262,504 | B1* | 7/2001 | Bartlett | 310/89 |
| 6,773,001 | B2 | 8/2004 | Saiki et al. | |
| 7,078,835 | B2 | 7/2006 | Gross et al. | |
| 7,318,394 | B2* | 1/2008 | Stevens et al. | 123/41.49 |
| 2006/0034707 | A1 | 2/2006 | Thomas et al. | |

* cited by examiner

*Primary Examiner*—Quyen Leung
*Assistant Examiner*—Jose A Gonzalez Quinones
(74) *Attorney, Agent, or Firm*—Patrick M. Griffin

(57) ABSTRACT

The invention provides a press in style motor attachment mount assembly. The assembly includes a motor and a vibration isolator. The motor has an end portion axially remote from the output end and a stop facing the output end. The vibration isolator includes a cup that axially receives the end portion of the motor. The cup includes an end wall, a sidewall, and flexible fingers integrally connected to the sidewall. The flexible fingers have a flexed position in which the tip of the flexible finger is disposed radially outwardly to allow axial assembly of the end portion of the motor into the cup and a locking position where the tip engages the first radial stop to prevent axial detachment of the motor from the cup.

8 Claims, 4 Drawing Sheets

PRESSED IN STYLE MOTOR ATTACHMENT

This application claims the benefit of U.S. provisional patent application Ser. No. 60/966,459 for a PRESSED IN STYLE MOTOR ATTACHMENT FOR PLASTIC POST ISOLATION, filed on Aug. 28, 2007, which is hereby incorporated by reference in its entirety. This claim is made under 35 U.S.C. §119(e); 37 C.F.R. §1.78; and 65 Fed. Reg. 50093.

TECHNICAL FIELD OF INVENTION

The invention relates to a press in style motor attachment; particularly, a press in style motor attachment for a motor mount assembly; and more particularly, a press in style motor attachment for a motor mount assembly having plastic posts for isolating the vibrations from an electric motor.

BACKGROUND OF INVENTION

Electric motors, such as that of an electric blower motor mounted onto an HVAC module of a vehicle, often produce vibrations in operation. The vibration can be transmitted through the mount of the motor to other components of the HVAC system and eventually to the passenger compartment of a vehicle. U.S. patent application Ser. No. 11/542,542 discloses a motor mount assembly having a plastic post isolation system for isolating vibrations from an electric motor. This type of mount may use various fasteners to attach the motor to the mount assembly.

General attaching arrangements used to fasten an electric motor to the vibration isolator motor mount assembly and other known electric motor mount assemblies have included the use of axial mounting studs protruding from the motor housing; band type mounts in the form of hoops or ring shaped wire straps that encircle the frame of the motor and attach to the motor mount by mounting arms; and bases that cradle the motors. Such bases have mount points to attach to the motor mount assembly. Known attaching arrangements require an inventory of fasteners, which increases the complexity of assembly.

What is needed is a vibration isolator motor mount assembly that has an electric motor attachment feature that eliminates the need for additional fasteners for the attachment of the electric motor. It is also desirable for this attachment feature to provide a positive indication that the electric motor is properly positioned and securely attached. A simple and efficient attachment of the electric motor onto the mount is also advantageous. An integral attachment feature is desirable for ease of manufacturability.

SUMMARY OF THE INVENTION

The invention provides a motor mount assembly for mounting an electric motor to a support structure such as that of a HVAC module. The motor mount assembly includes an electric motor having particular and distinct features that are adapted to engage with corresponding features contained within a vibration isolator to eliminate the need for additional motor fasteners. The vibration isolator is operable to isolate vibration associated with the electric motor and is adapted to attach to a HVAC module (not shown). The vibration isolator may be molded as an integral part of the HVAC module.

The motor includes a drive shaft rotatable about an axis and a housing that encloses the drive shaft and is generally symmetrical about the axis. The motor also includes an output end where the drive shaft is accessible. The motor housing includes an end portion that is axially remote from the output end. The end portion includes an end cap that has protruding tabs with corresponding radial stops facing the output end of the motor.

The vibration isolator includes an inner cup section and an outer cup section that is integrally connected to the inner cup with isolation posts. The outer cup section is radially spaced apart from the inner cup. The inner cup defines a compartment with an open end that axially receives the end portion of the motor. The inner cup includes a sidewall circumferentially disposed about the end portion of the motor and slots adapted to receive the protruding tabs of the electric motor's end cap for guiding the end portion during insertion and preventing circumferential displacement of the motor relative to the cup. The inner cup further includes an end wall forming a closed end to engage the end portion of the electric motor to prevent axial displacement of the motor relative to the housing in a first direction toward mounting end of the assembly. The inner cup still further includes a flexible finger integrally connected to the sidewall.

The flexible finger extends axially along the inner cup and includes a tip. The flexible finger has a flexed position wherein the tip is disposed radially outwardly to allow axial assembly of the end portion of the electric motor into the compartment and a locking position wherein the tip engages the radial stop to prevent axial displacement of the motor from the cup when assembled.

During assembly, the motor and vibration isolation unit are axially aligned where the end portion of the motor is oriented toward the compartment of the inner cup. The motor is then axially rotated where each tab is aligned with the corresponding slot. Upon alignment, the motor is axially inserted into inner cup, during which time the tab guided by the corresponding axial ribs which defines the slot. As the tab is slid axially toward the closed end of the inner cup, the tab urges the corresponding flexible finger outward away from the axis. When the motor enters the inner cup, the tab snaps into the aperture defined between tip of the flexible finger and radial stop. The flexible finger reposition itself where the tip abuts the radial stop of tab and securely contains the motor in inner cup.

The vibration isolator motor mount assembly eliminates the need for additional fasteners for the attachment of the electric motor onto the mount. It also provides a positive indication that the electric motor is properly positioned and securely attached by the sound and feel of the flexible finger snapping in position. The flexible finger is an integral part of the vibration isolator motor mount assembly for the ease of manufacturability.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
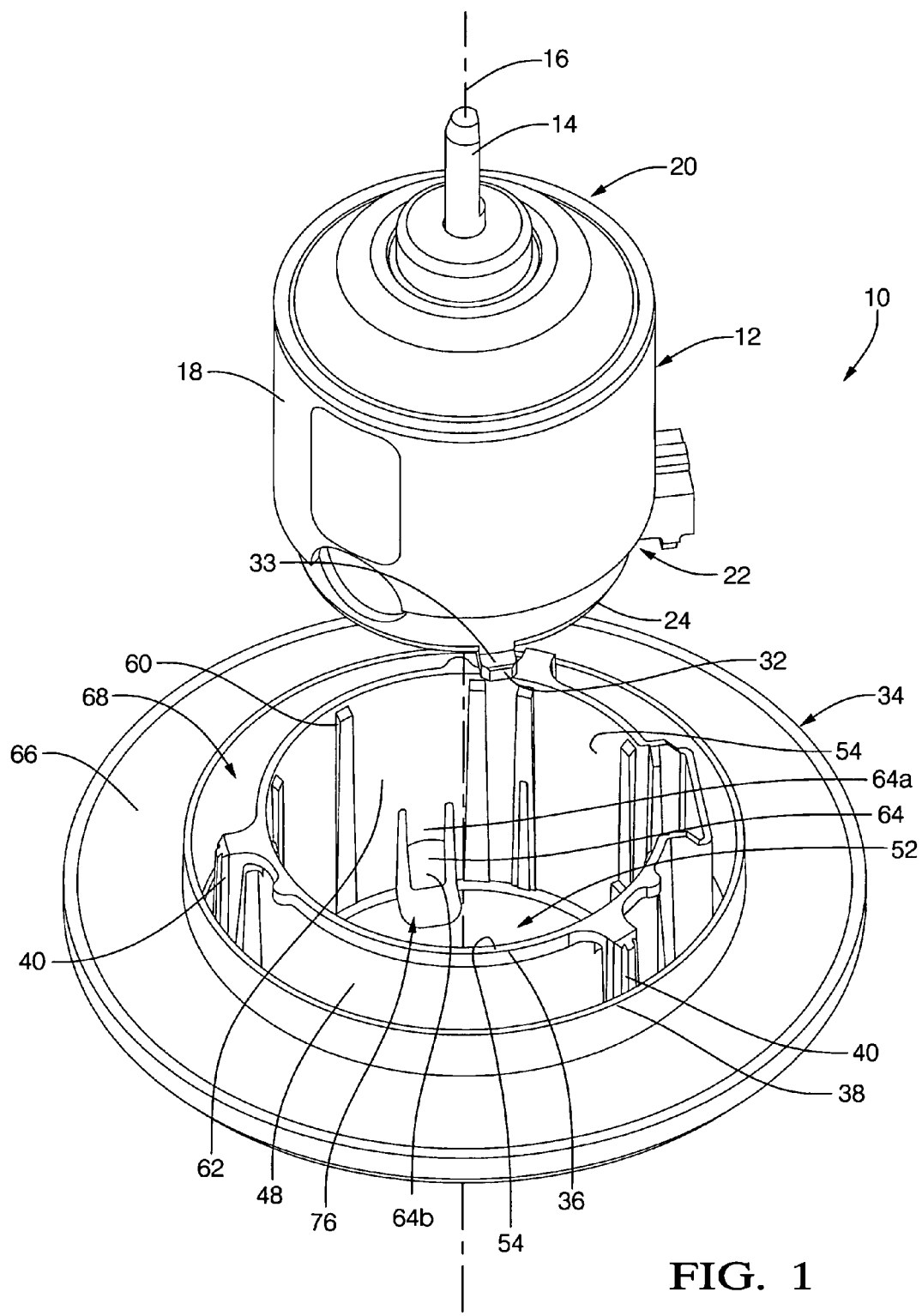
FIG. 1 is an exploded perspective view of an electric motor positioned axially apart from a vibration isolator.

As shown in the figures, similar features are structured similarly, operate similarly, and/or have the same functions unless otherwise indicated by the drawings or this specification. Similar features have been numbered with a common reference numeral. In accordance with a preferred embodiment of this invention, referring to FIGS. 1 through 5, a motor mount assembly 10 includes a motor 12 having particular and distinct features that are adapted to engage with corresponding particular and distinct features contained within a vibration isolator 34 to eliminate the need for additional fasteners to hold motor 12 in vibration isolator 34. Vibration isolator 34 is operable to isolate vibrations associated with motor 12 and is adapted to attach to a HVAC module (not shown) or molded as an integral part of the HVAC module. Both motor 12 and vibration isolator 34 are concentrically located along a common central axis 16.

Best shown in FIG. 1, motor 12 is typical of that of an electric type, having a drive shaft 14 along a central axis 16. Symmetrically about central axis 16 is motor housing 18 enclosing drive shaft 14. Motor 12 includes an output end 20 where drive shaft 14 is accessible and an end portion 22 opposite and axially remote from output end 20. Drive shaft 14 is adapted to engage to a means, such as a cage fan, to incite air flow in an HVAC module. End portion 22 includes an end cap 24 to cooperate with motor housing 18 to seal the internal workings of the motor from contaminants in the working environment. End cap 24 is adapted to cooperate with unique attachment features of vibration isolator 34 to secure motor 12 to vibration isolator 34 by interference and snap fit.

Figure 2:
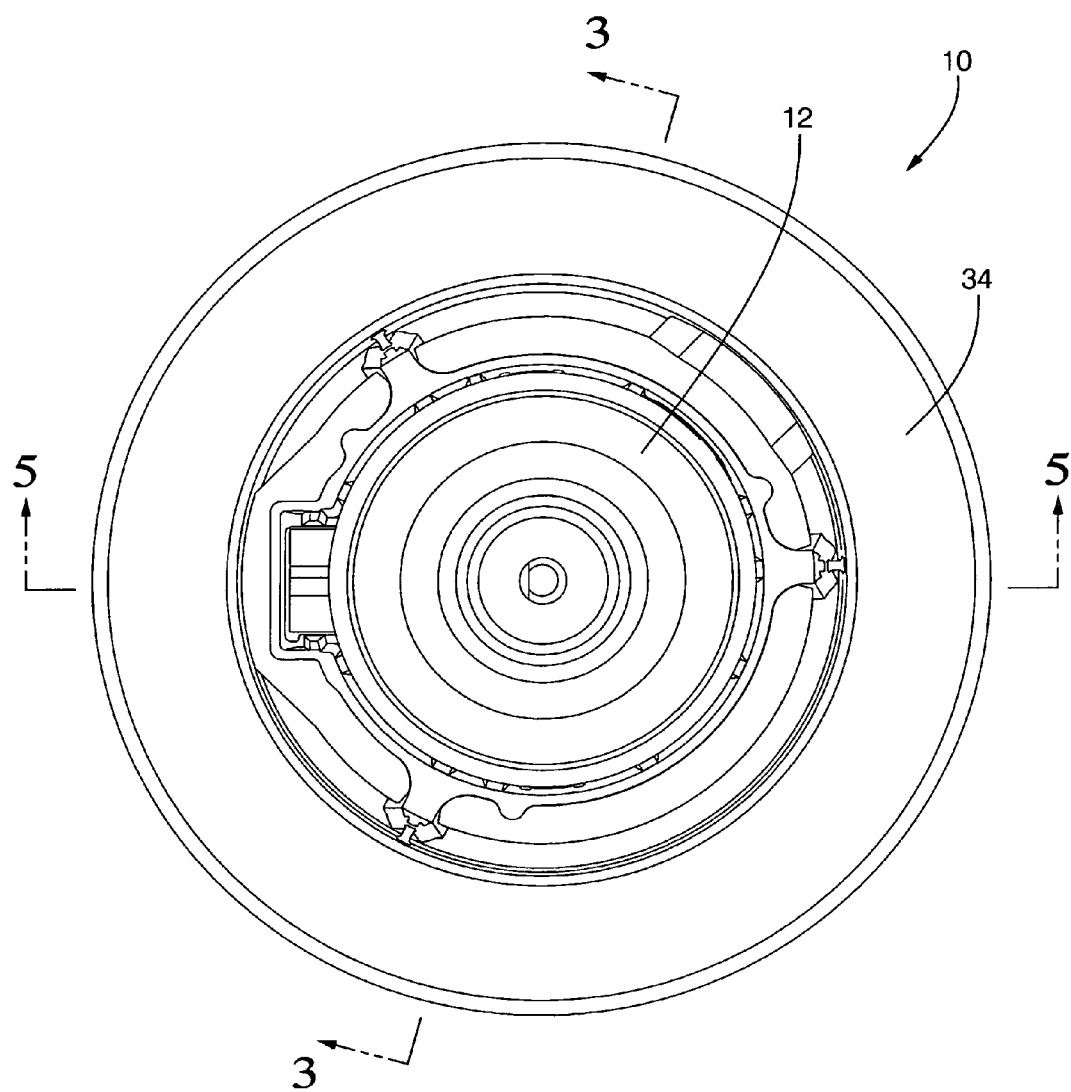
FIG. 2 is a top view of electric motor assembled onto vibration isolator showing section lines 3-3, and 5-5.
Figure 4:
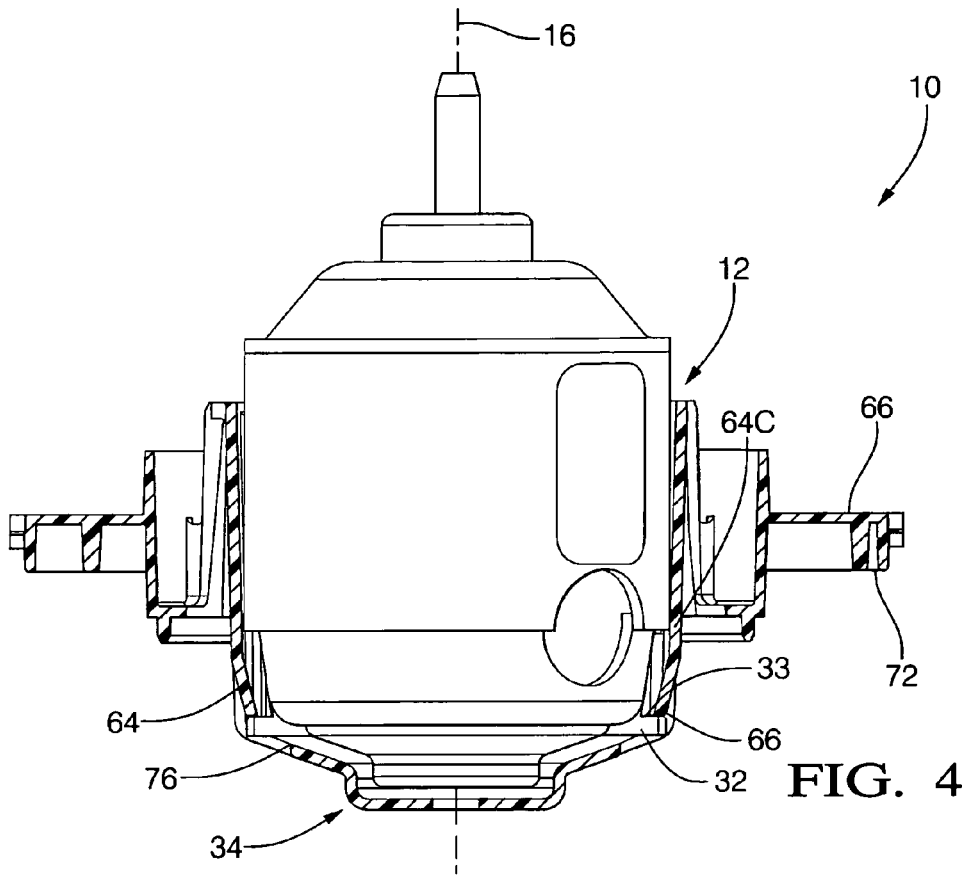
FIG. 4 is a side view of the electric motor assembled onto cross section view of vibration isolator along section line 3-3.
Figure 5:
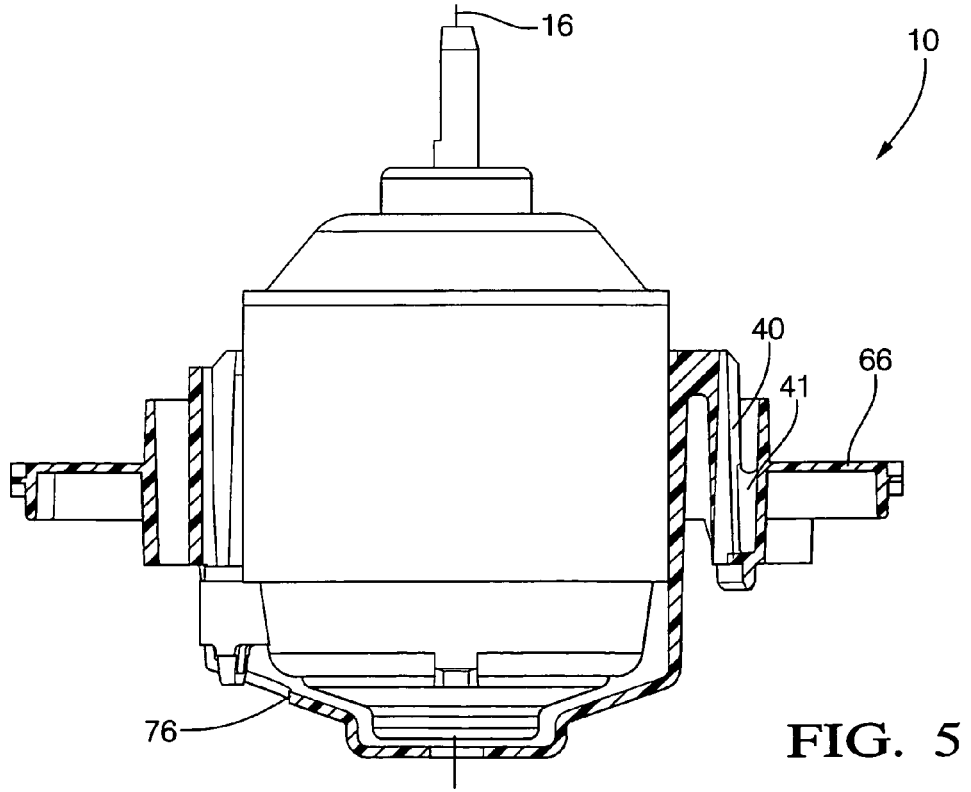
FIG. 5 is a side view of the electric motor assembled onto cross section view of vibration isolator along section line 5-5.

Best shown in FIG. 2 is a plan view of motor mount assembly 10 where motor 12 is positioned and assembled onto vibration isolator 34. Shown are cut lines 3-3 and 5-5 where the cross sectional views of the assembled motor mount assembly are shown in FIGS. 4 and 5 respectively. The cross sectional view of vibration isolator 34 along cut line 3-3 is also shown in FIG. 3 along with motor 12 axially positioned from vibration isolator 34.

Figure 3:
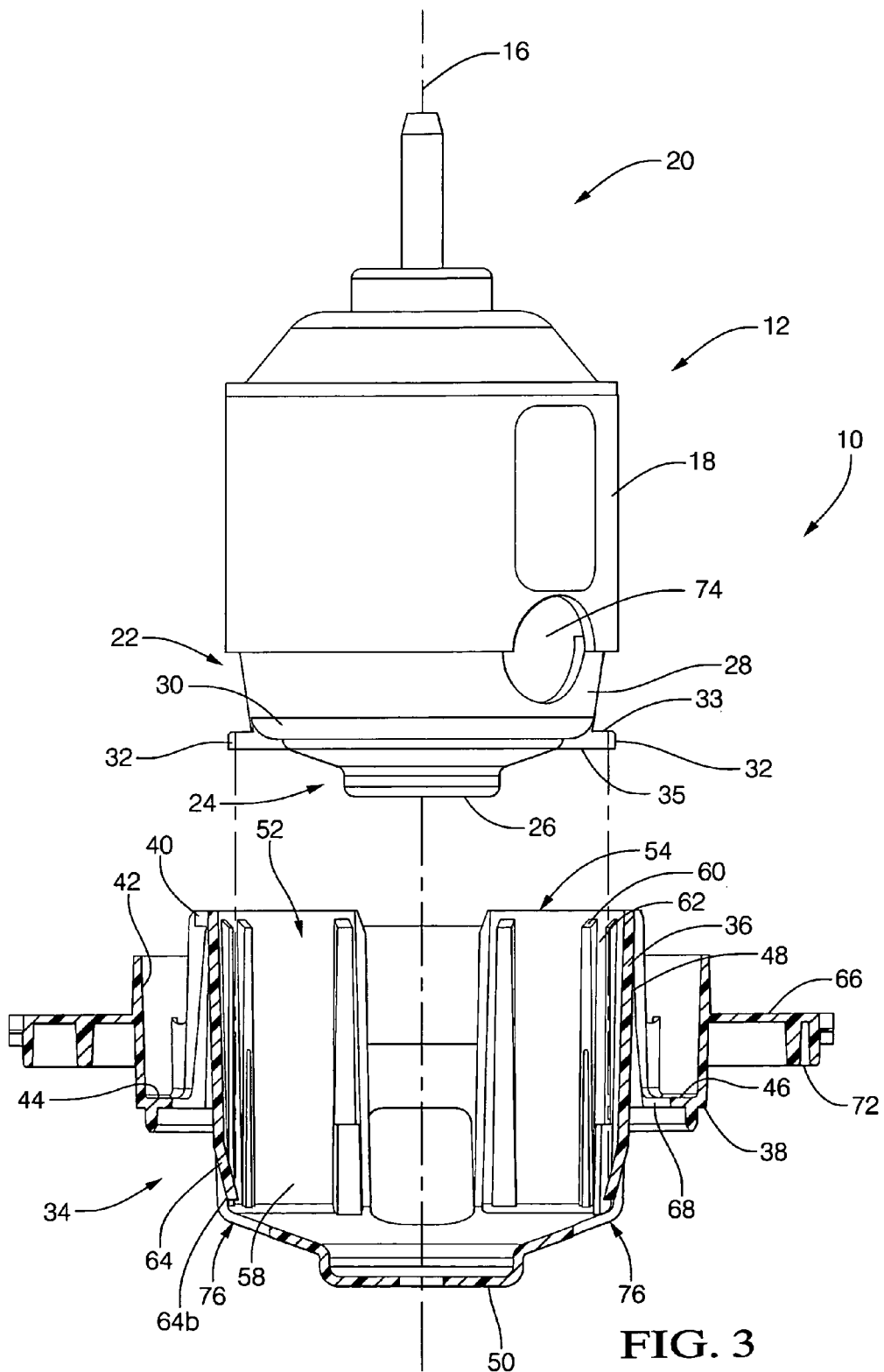
FIG. 3 is a side view of the electric motor positioned axially apart from a cross sectional view of the vibration isolator along section line 3-3.

Shown in FIG. 3, end cap 24 includes an end surface 26 that is substantially perpendicular to central axis 16. End surface 26 transitions to a side surface 28 at a radial distance from the central axis 16 that is less than the radial distance of motor housing 18 from central axis 16. Side surface 28 extends substantially parallel to central axis 16 and toward output end 20 to engage motor housing 18. A perimeter edge 30 is defined at the boundary interface where end surface 26 transitions into side surface 28. Extending from perimeter edge 30, substantially perpendicular to central axis 16, is a plurality of tabs 32. Tabs 32 are distributed substantially symmetrically about central axis 16 in a radially outward direction. Located on each tab 32 is a first radial stop 33 that faces toward output end 20 of motor 12 and a second radial stop 35 opposite of first radial stop 33. Tabs 32 protrude at predetermined length and width that cooperates with corresponding features of vibration isolator 34, which will be discussed in detail herein below.

Also shown in FIGS. 1 and 3 is vibration isolator 34 that includes an inner cup 36 and an outer cup section 38 that is concentrically located about central axis 16. A plurality of isolation posts 40, which are best shown in FIG. 1, seamlessly joins inner cup 36 to outer cup section 38; thereby, forming a one piece integral vibration isolator 34. Inner cup 36 has an outer surface 48 that faces away from central axis 16, a closed end 50, and a rim 54 opposite and axially spaced from closed end 50 to define compartment 52 that axially receives end portion 22 of motor 12. Outer cup section 38 has an inner surface 42 that faces toward outer surface 48 of inner cup 36. Circumscribing vibration isolator 34 is flange 66. Flange 66 includes fastener supports 72 to mount to an HVAC module (not shown). In an alternative embodiment, flange 66 may be integrally molded with HVAC module; thereby eliminating the need for fastener supports 72. Inner cup 36 may include openings or ports 74 to accommodate electrical connections for motor 12 or to provide air circulation for the cooling of motor 12.

Circumferentially located about inner surface 42 of outer cup section 38 is a protruding ledge 44 that extends between inner surface 42 toward, but not in contact with, the outward surface 48 of inner cup 36. Protruding ledge 44 is substantially perpendicular to central axis 16 and includes a ledge surface 46 that is oriented toward output end 20 of motor 12. Protruding ledge 44 is spaced apart from inner cup 36 to define a channel 68 to prevent first order vibrations from transferring to outer cup section 38 from inner cup 36. Extending from ledge surface 46 toward rim 54 of inner cup 36 are a plurality of isolation posts 40 that integrally connects inner cup 36 with outer cup section 38. Best shown in FIG. 5, each isolation post 40 is symmetrically positioned radially from central axis 16 and may be tapered toward output end 20. Isolation post 40 may include cross sectional profile of any shape to provide enhanced structural rigidity and increased vibration isolation characteristics. Isolation post 40 may include radial ribs 41, shown in FIG. 5, for enhanced vibration dampening.

Shown in FIG. 3, inner cup 36 includes interior side wall 58 that is oriented toward and concentrically located about central axis 16. Interior side wall 58 includes axial ribs 60 that run along length of interior side wall 58 substantially parallel to central axis 16. Portion of interior side wall 58 located between paired axial ribs 60 defines a corresponding slot 62. Slots 62 are adapted to cooperate with corresponding tabs 32 to guide end portion 22 of motor 12 during insertion of motor 12 into inner cup and to prevent circumferential displacement of motor 12 relative to inner cup 36. Axial ribs 60 also provide structural integrity to enhance the radial stiffness of inner cup 36 as well as provide an inference fit to motor housing 18 once motor 12 is assembled onto inner cup 36.

Located within each slot 62 is a corresponding flexible finger 64. Each flexible finger 64 includes a first end 64a that is integral with inner cup 36 and tip 64b that extends toward closed end 50, but spaced apart from closed end 50 to define an aperture 76 as shown in FIG. 3. Flexible finger 64 is biased toward central axis 16, but is capable of being flexed radially outwardly by corresponding tab 32 of motor 12 to allow axial assembly of end cap 24 of motor into compartment 52 of inner cup 36. Best shown in FIG. 4, upon assembly, tab 32 is positioned into aperture 76. First radial stop 33 of motor cooperates with tip 64b of flexible finger 64 to secure motor 12 within inner cup 36 in a locking position, where tip 64b engages first radial stop 33 to prevent axial and rotational displacement of motor.

End cap 24 of motor 12 may be made of any rigid material such as metal or plastic. Tab 32 of end cap 24 is preferably stamped from the same work piece that forms the end cap 24 or integrally molded into end cap 24 if the end cap 24 is constructed of a plastic material. Vibration isolator 34, including inner cup 36, outer cup section 38 and vibration isolation post 40 is preferably molded out of plastic such as polypropylene, ABS, and nylon in a single line of draw.

Vibration isolator 34 may also be integrally molded into an HVAC module or other structure.

During assembly, motor 12 and vibration isolator 34 are axially aligned with end cap 24 of motor 12 oriented to face open compartment 52 of inner cup 36. Motor 12 is axially rotated with each tab 32 aligned with a corresponding slot 62 defined by axial ribs 60. Upon alignment, motor 12 is inserted axially into inner cup 36, during which time tabs 32 are guided by slots 62. As tabs 32 slide axially toward closed end 50, tabs 32 urge flexible fingers 64 outward away from central axis 16. When motor 12 is pressed to seat end cap 24 onto inner cup 36, tabs 32 snap into apertures 76 provided between flexible fingers 64 and inner cup bottom. Flexible fingers 64 reposition themselves until tips 64b abut tabs 32 to securely contain motor 12 in inner cup.

While the invention has been described in reference to a preferred exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carry out this invention, but that the invention will include all embodiments falling within the scope of the appended claims.

We claim:

1. A press in style motor attachment mount assembly comprising:
    a motor having a central axis and comprising a housing having an end portion and a plurality of tabs protruding substantially symmetrically about the central axis in a radially outward direction from the end portion, and
    an inner cup defining a compartment adapted to axially receive the motor, the compartment having an open end, a closed end adjacent to the end portion of the motor, a sidewall therebetween, and a plurality of flexible fingers corresponding to said plurality of tabs,
    wherein each of the flexible fingers includes a first end integral with said sidewall and a flexible portion detached from said sidewall extending axially and radially inwardly toward the central axis from the sidewall, said flexible portion includes a flexed position wherein the flexible portion is disposed radially outwardly and a locking position wherein the flexible portion engages the tab to secure the motor within the compartment.

2. A press in style motor attachment mount assembly of claim 1, wherein the flexible portion includes a tip that is adapted to abut the tab of the motor to prevent axial displacement of the motor from the inner cup when flexible portion is in the locking position.

3. A press in style motor attachment mount assembly of claim 2, wherein the tip of the flexible portion is spaced from the closed end to define an aperture, wherein the tab of the motor is positioned in the aperture when the flexible portion is in the locking position.

4. A press in style motor attachment mount assembly of claim 2, wherein the inner cup further comprises:
    an interior side wall that is oriented toward and concentrically located about the central axis, and
    a plurality of ribs protruding from said interior side wall and extending axially parallel to the central axis, wherein the ribs are paired to define slots corresponding to said plurality of tabs of motor.

5. A press in style motor attachment mount assembly of claim 4, wherein the slots are adapted to cooperate with corresponding tabs to guide the end portion of the motor during insertion of the motor into the cup to prevent circumferential displacement of the motor relative to the inner cup.

6. A press in style motor attachment mount assembly of claim 5, further comprising:
    an outer cup section,
    a plurality of vibration isolation posts seamlessly joining said inner cup to said outer cup section, said plurality of vibration isolation posts extends substantially parallel to said axis in such a way that said inner cup, vibration isolation posts, and said outer cup section may be integrally molded from a plastic material in a single line of draw.

7. A press in style motor attachment mount assembly of claim 3, wherein said tab includes a first radial stop facing the output end and abuts the tip of the flexible finger when the flexible finger is in the locking position.

8. A press in style motor attachment mount assembly of claim 6, wherein each of said plurality of vibration isolation posts includes radial ribs buttressing the vibration isolation posts to the outer cup section, wherein said radial ribs provide first order vibration isolation from the inner cup to the outer cup section.

* * * * *